United States Patent
Igarashi et al.

(10) Patent No.: US 10,829,617 B2
(45) Date of Patent: Nov. 10, 2020

(54) FLAME-RETARDANT COMPOSITE MAGNETIC BODY

(71) Applicant: TOKIN Corporation, Sendai (JP)

(72) Inventors: Toshiyuki Igarashi, Sendai (JP); Hiroyuki Yoshida, Sendai (JP); Masahiko Fuji, Sendai (JP); Masakazu Abe, Sendai (JP)

(73) Assignee: TOKIN CORPORATION, Miyagi (JP)

( * ) Notice: Subject to any disclaimer, the term of this patent is extended or adjusted under 35 U.S.C. 154(b) by 311 days.

(21) Appl. No.: 15/743,173

(22) PCT Filed: Jul. 6, 2016

(86) PCT No.: PCT/JP2016/069975
§ 371 (c)(1),
(2) Date: Jan. 9, 2018

(87) PCT Pub. No.: WO2017/010363
PCT Pub. Date: Jan. 19, 2017

(65) Prior Publication Data
US 2018/0201762 A1 Jul. 19, 2018

(30) Foreign Application Priority Data
Jul. 10, 2015 (JP) .................................. 2015-138674

(51) Int. Cl.
| C08K 5/5399 | (2006.01) |
| H01F 1/26 | (2006.01) |
| C08K 5/544 | (2006.01) |
| H01F 41/02 | (2006.01) |
| C08K 3/08 | (2006.01) |
| C08L 101/00 | (2006.01) |
| C08K 3/22 | (2006.01) |
| C08K 3/34 | (2006.01) |
| C08L 33/10 | (2006.01) |
| C08L 101/08 | (2006.01) |
| C08K 5/00 | (2006.01) |
| C08K 3/016 | (2018.01) |
| C08L 33/08 | (2006.01) |

(52) U.S. Cl.
CPC .............. *C08K 5/5399* (2013.01); *C08K 3/08* (2013.01); *C08K 3/22* (2013.01); *C08K 3/34* (2013.01); *C08K 5/544* (2013.01); *C08L 33/10* (2013.01); *C08L 101/00* (2013.01); *C08L 101/08* (2013.01); *H01F 1/26* (2013.01); *H01F 41/0246* (2013.01); *C08K 3/016* (2018.01); *C08K 5/0025* (2013.01); *C08K 2003/2224* (2013.01); *C08L 33/08* (2013.01)

(58) Field of Classification Search
CPC ................................ H01F 1/26; C08K 5/5399
See application file for complete search history.

(56) References Cited

FOREIGN PATENT DOCUMENTS

| JP | 2005-146199 A | 6/2005 |
| JP | 2006-073949 A | 3/2006 |
| JP | 2010-111812 A | 5/2010 |
| JP | 2011-181679 A | 9/2011 |
| WO | WO-2004/086837 A1 | 10/2004 |

OTHER PUBLICATIONS

International Search Report dated Sep. 13, 2016 in PCT/JP2016/069975 with English-language translation (4 pgs.).

*Primary Examiner* — C Melissa Koslow
(74) *Attorney, Agent, or Firm* — Foley & Lardner LLP

(57) ABSTRACT

Provided is a composite magnetic body composite magnetic body including a flaky metallic soft magnetism powder with a volume content of 35% or more and 55% or less, wherein the composite magnetic body is characterized by further including a phosphazene compound, a binder resin, and a phosphorus-free flame retardant auxiliary so that equations (1) and (2) are satisfied:

$$0.17 \leq P/B \leq 0.21 \quad (1)$$

$$0.89 \leq (PN+RA)/B \leq 2.71 \quad (2)$$

(In the equations, PN denotes the mass % of the phosphazene compound in the composite magnetic body, RA denotes the mass % of the flame retardant auxiliary in the composite magnetic body, B denotes the mass % of the binder resin in the composite magnetic body, and P denotes the mass % of phosphorus in the composite magnetic body.) The composite magnetic body can impart high flame retardancy without losing performance such as magnetic permeability.

17 Claims, 1 Drawing Sheet

[Fig. 1]
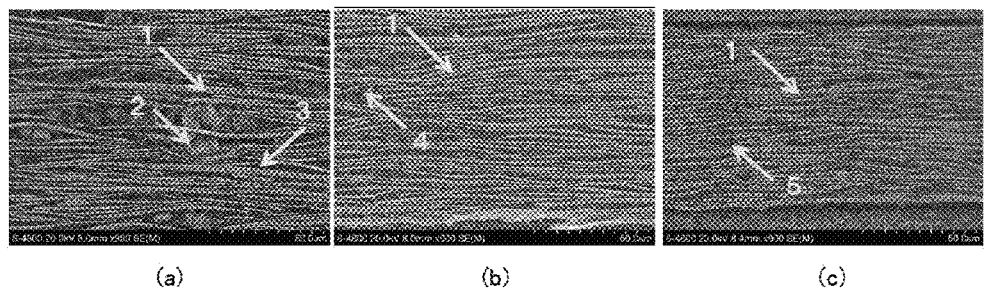
(a)  (b)  (c)
[Fig. 2]
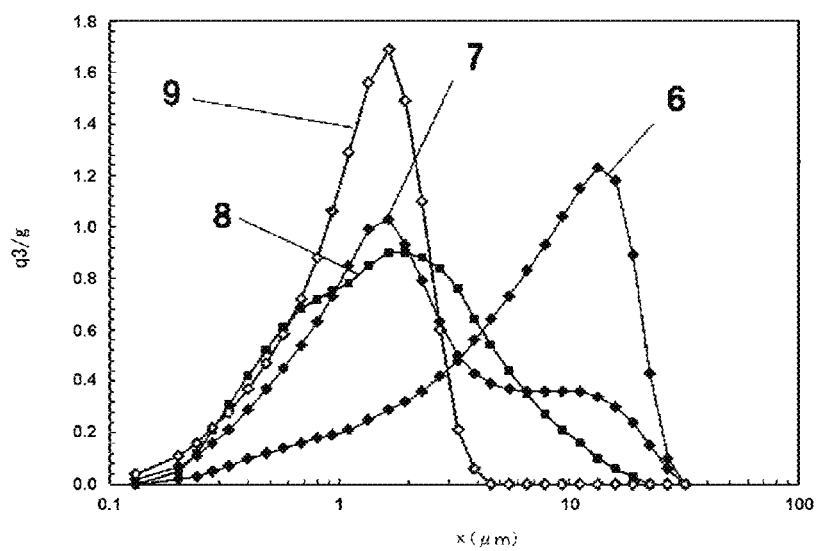
| | | Particle size distribution | | | Standard deviation (μm) |
|---|---|---|---|---|---|
| | | D10 | D50 | D90 | |
| 6 | 42.5%P - 57.5%Al(OH)$_3$ | 1.2 | 7.6 | 17.3 | 6.7 |
| 7 | 37.5%P - 62.5%Al(OH)$_3$ | 0.5 | 1.7 | 9.4 | 2.9 |
| 8 | $C_3H_6N_6 \cdot C_3H_3N_3O_3$ | 0.5 | 1.6 | 5.5 | 1.8 |
| 9 | Mg(OH)$_2$ | 0.4 | 1.3 | 2.3 | 0.75 |

FLAME-RETARDANT COMPOSITE MAGNETIC BODY

CROSS-REFERENCE TO RELATED APPLICATIONS

This application is a national stage entry of International Appl. No. PCT/JP2016/069975, filed Jul. 6, 2017, which claims priority to Japanese Appl. No. 2015-138674, filed Jul. 10, 2015; the disclosures of both of which are incorporated by reference herein in their entirety.

TECHNICAL FIELD

The present invention relates to a composite magnetic body that is useful for magnetic sheets that prevent high frequency noise caused by electronic devices, especially a composite magnetic body in which metallic soft magnetism powder is mixed and dispersed in resin and flame retardancy is imparted.

BACKGROUND ART

In today's world, electromagnetic wave interference has become a problem inside some particularly small electronic devices, such as cell phones or smartphones. In such devices, there is only a small space to place a part like an electromagnetic wave absorption sheet. It is required to absorb the minimum necessary electromagnetic wave in a narrow space like as a space of 100 μm or less.

Moreover, as the amount of data processing increases, the CPU and capacitors etc inside the electronic devices may cause abnormal heat generation. So, high flame retardancy is required in the electromagnetic wave absorption materials as well to prevent internal ignition.

Usually, flame retardancy in a resin material is given by combining a phosphorous ingredient that creates char with a flame-retardant auxiliary that increases flame retardancy by way of physical or chemical reaction. From environmental viewpoints, the use of halogen-free and antimony-free flame-retardants is being reviewed.

For phosphorous ingredients, red phosphorus is commonly used. However, red phosphorous is a granular ingredient and thus disrupts the orientation of the metallic magnetism powder that is mixed in for magnetic sheets, especially flat particle magnetic powder. This will affect magnetic permeability.

Patent Literature 1 discloses the configuration of an electromagnetic wave absorption sheet that has flame retardancy through organic phosphorous compound without using granulated red phosphorous. It also discloses an art of preventing moisture absorption by using multifunctional epoxy resin as a cross-linking agent.

Patent Literature 2 describes a configuration of noise suppression sheets that use a ferromagnetic powder such as hexagonal ferrite as a primary ingredient but contains metallic soft magnetism powder and phosphazene as secondary ingredients, as disclosed in paragraphs [0050], [0051], and [0056].

CITATION LIST

Patent Literature

PLT1: JP 2011-181679 A
PLT2: JP 2010-111812 A

SUMMARY OF INVENTION

Technical Problem

Phosphate esters used in Patent Literature 1 easily absorb moisture. Therefore, there is a problem that the influence of moisture absorption cannot be sufficiently suppressed even contriving a cross-linking agent.

In Patent Literature 2, there is a problem that flame retardancy is not secured when metallic soft magnetism powder is used as a primary ingredient.

Therefore, the present invention is to provide a composite magnetic body that uses metallic soft magnetism powder, especially flaky metallic soft magnetism powder, as a primary ingredient, and that has high flame retardancy without losing performance such as magnetic permeability.

Solution to Problem

According to one aspect of the present invention, it can be provided a composite magnetic body including a flaky metallic soft magnetism powder with a volume content of 35% or more and 55% or less, wherein the composite magnetic body is characterized by further including a phosphazene compound, a binder resin, and a phosphorus-free flame retardant auxiliary so that equations (1) and (2) are satisfied:

$$0.17 \leq P/B \leq 0.21 \tag{1}$$

$$0.89 \leq (PN+RA)/B \leq 2.71 \tag{2}$$

(In the equations, PN denotes the mass % of the phosphazene compound in the composite magnetic body, RA denotes the mass % of the flame retardant auxiliary in the composite magnetic body, B denotes the mass % of the binder resin in the composite magnetic body, and P denotes the mass % of phosphorus in the composite magnetic body.)

Advantageous Effects of Invention

According to the present invention, a composite magnetic body that uses metallic soft magnetism powder as a primary ingredient can be given high flame retardancy without losing performance such as magnetic permeability.

BRIEF DESCRIPTION OF DRAWINGS

FIG. 1 shows cross-section SEM images of the sheets in Comparative Example 1: (a), Example 2: (b), and Example 3: (c).

FIG. 2 is a drawing that shows the particle size distribution of each flame-retardant ingredient (granular material).

DESCRIPTION OF EMBODIMENTS

Hereinbelow, the embodiments of the present invention will be explained with specific examples. However, the present invention is not limited to these specific examples.

<Composite Magnetic Body>

The composite magnetic body according to the present invention includes flaky metallic soft magnetism powder with a volume content of 35% or more and 55% or less. It also contains a phosphazene compound, a binder resin, and a phosphorous-free flame retardant auxiliary.

[Flaky Metallic Soft Magnetism Powder]

Examples of the flaky metallic soft magnetism powder include flaky soft magnetism powders of alloy materials such as Sendust (Fe—Si—Al), electromagnetic soft iron (Fe), silicon steel (e.g., Fe—Si, Fe—Si—Cr), stainless steel (Fe—Cr), iron-aluminum alloy (Fe—Al, Fe—Al—Cr), permalloy (Fe—Ni), permendur (Fe—Co), iron-based amorphous alloy, Co-based amorphous alloy, and iron-based nanocrystal material.

The flaky metallic soft magnetism powder is contained with a volume content of 35% or more and 55% or less. At a quantity of below 35 vol. %, it is difficult to give sufficient magnetic permeability. If the quantity exceeds 55 vol. %, the amounts of the binder resin and the flame-retardant ingredient are not sufficient, and the flaky metallic soft magnetism powder falls out, so it becomes difficult to impart flame retardancy. The flaky metallic soft magnetism powder is thus preferably contained with a volume content of 35% or more and 50% or less.

[Phosphazene Compound]

Phosphazene compound is a char-creating component that contains a —P=N— bond. There are no specific restrictions as long as they are effective as flame retardants, but phenoxy group-substituted phosphazene compound and a cross-linked compound thereof are preferred. Among them, polybisphenoxy-phosphazene compound (—[$P(C_6H_5O)_2N$]$_n$—) is preferred for flame retardancy. Examples thereof include cyclic bisphenoxy-phosphazene compound represented by the general formula (A), or linear bisphenoxy-phosphazene compound represented by the general formula (B).

[Chemical Formula 1]

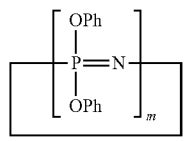

(A)

(In the formula, m represents an integer of 3 to 25, and Ph represents a phenyl group.)

[Chemical Formula 2]

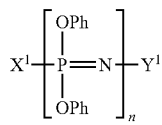

(B)

(in the formula, $X^1$ represents group —N=P(OPh)$_3$ or group —N=P(O)OPh, $Y^1$ represents group —N=P(OPh)$_4$ or group —N=P(O)(OPh)$_2$, n represents an integer of 3 to 1,000 and Ph represents a phenyl group.)

In addition, another compound that is appropriate for use is cross-linked phenoxy phosphazene compound, in which the compound in the chemical formula (A) and/or chemical formula (B) is cross-linked by at least one type of cross-linking group selected from the group consisting of o-phenylene group, m-phenylene group, p-phenylene group or bis-phenylene group represented by the general formula (C).

[Chemical Formula 3]

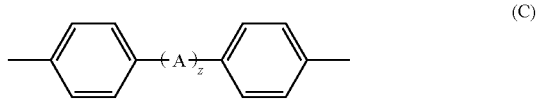

(C)

(In the formula, A represents —C(CH$_3$)$_2$—, —SO$_2$—, —S—, or —O—, and z represents 0 or 1.)

For the above cross-linked phenoxy phosphazene compound, it is preferably a phenylene-based cross-linked phenoxy phosphazene compound having at least one phenolic hydroxyl group that uses the cyclic bisphenoxy-phosphazene compound (A) and/or the linear bisphenoxy-phosphazene compound (B), while the phenylene-based cross-linking group lies between the two oxygen atoms in which the phenyl group of the bisphenoxy-phosphazene compound has been eliminated, and the percentage amount of phenylene group in the cross-linked phenoxy phosphazene compound is in a range of 50 to 99.9% based on the total of the phenyl groups in the (A) and/or (B) in the above-mentioned compounds.

The polybisphenoxyphosphazene has a structure in which phosphorous atom is surrounded by hydrophobic benzene rings. Thus, the moisture absorption is about 1/10 of the conventional char ingredient such as phosphoric acid ester. When used in a composite magnetic body such as magnetic sheets, expansion rate under high temperature and high humidity is small, and magnetic permeability is hardly deteriorated. Further, the polybisphenoxyphosphazene has excellent solubility in an organic solvent such as toluene, and when compared to red phosphorous as a char ingredient, it can maintain a certain level of face magnetic permeability without interrupting the filling or orientation of the flaky metallic soft magnetism powder.

Also, the polybisphenoxyphosphazene is an oligomer or a polymer, so it can constitute magnetic sheets as an organic binding material together with a binder resin. For this reason, the flaky powder in the magnetic sheets does not fall due to the reduced amount of binder caused by the adding of a flame retardant. Moreover, it is also excellent in pressure molding ability, so it can provide magnetic sheets with high magnetic permeability even through forming in a short period of time.

[Binder Resin]

For a binder resin, any resin ingredient can be used as long as it can be formed into sheets after adding the flaky metallic soft magnetism powder. It is, though, particularly preferred that rubber and elastomer ingredients be used because they are flexible and the flaky metallic soft magnetism powder can be highly-filled. For instance, (meth)acrylic polymers such as acrylic rubber and alkyl acrylate copolymer, and olefin rubbers such as acrylonitrile butadiene rubber (NBR), silicone rubber, polyurethane, polyethylene, ethylene propylene rubber (EPM), and ethylene propylene diene rubber (EPDM) can be used.

Further, for a binder resin, thermoplastic resins that have high flame retardancy such as poly-phenylene-oxide (PPO) can also be used. They can partially function as a flame retardant auxiliary.

These binder resins can be used alone, or a plurality of them can be used in combination.

It is preferred that the phosphazene compound and the binder resin are dissolved in advance in an appropriate solvent to form an organic binding material. By using a solvent that dissolves both and making the organic binding material, phosphazene compound can be uniformly distributed in the organic binding material and the uniformity of the flame retardancy is enhanced.

There are no specific limitations for the solvent, but examples include those with excellent solubility for phosphazene compounds, such as acetone, methylethylketone, dimethylformamide, cyclohexanone, and toluene.

[Phosphorous-Free Flame Retardant Auxiliary]

For phosphorous-free flame retardant auxiliary, it is preferred that it could impart flame retardancy along with the phosphazene compound as a char former by way of endothermy or oxygen-interception action. Examples of them include inorganic or organic phosphorous-free flame retardants or flame retardant auxiliaries. Further, for halogen-free, it is preferred that it does not have halogen atoms.

For inorganic flame retardant or flame retardant auxiliary, examples include metal hydroxide such as aluminum hydroxide and magnesium hydroxide, metal oxide such as zinc oxide, and expandable graphite.

For organic flame retardant or flame retardant auxiliary, examples include nitrogen-containing cyclic compounds. Of them, melamine cyanurate is preferred. Melamine cyanurate has effects of endothermy and oxygen-interception action (oxygen concentration diluting action).

The organic binding material containing the phosphazene compound and the binder resin, and the flame retardant auxiliary need to satisfy the following equations (1) and (2):

$$0.17 \leq P/B \leq 0.21 \quad (1)$$

$$0.89 \leq (PN+RA)/B \leq 2.71 \quad (2)$$

(In the equations, PN denotes mass % of the phosphazene compound in the composite magnetic body, RA denotes mass % of the flame retardant auxiliary in the composite magnetic body, B denotes mass % of the binder resin in the composite magnetic body, and P denotes mass % of phosphorus in the composite magnetic body.)

In the organic binding material containing the phosphazene compound and the binder resin, if PB as represented in the above equation (1) is smaller than 0.17 for the amount of phosphorous atoms, the area that forms char is small, and it burns off in a UL94 flame retardancy test. If PB is greater than 0.21, phosphorous burns off and cannot satisfy the UL94V-0 standard.

Further, by satisfying the above equation (2), the balance of phosphazene compound and flame retardant auxiliary in the binder resin is excellent, and it can satisfy the UL94V-0 standard.

(Silane Compound)

The composite magnetic body according to the present invention preferably contains a silane compound in addition to the above-mentioned ingredients. For a silane compound, examples include coupling agents such as titanate silane coupling agent or aluminate silane coupling agent, or amine cross-linking agents such as 3-aminopropyl ethoxysilane that cross-link resin ingredients and enhance resistance to high-temperature, high-humidity environment.

The composite magnetic body according to the present invention can be formed into a sheet to make a magnetic sheet. The magnetic sheet can be used as noise suppression sheets, electromagnetic interference shielding, magnetic shielding, or magnetic yoke for RFID antennas placed in the circuits inside electronic devices such as personal computers or inside the main body of cellular phones or smartphones.

The magnetic sheet can be produced by performing a hot press of the composite magnetic body according to the present invention.

EXAMPLES

Hereinbelow, the present invention will be explained in detail with examples. However, the present invention is not limited to the examples.

Flame Retardancy Test (UL94V Test)

For the piece for the test, a piece with a width of 13 mm, length of 130 mm, and thickness of 0.1 mm was used. Others were carried out in accordance with the UL94V test.

Reference Example 1

An organic binding material was prepared by mixing 32.52 vol. % of solid content of alkyl acrylate copolymer dissolved in toluene and 13.93 vol. % of polybisphenoxyphosphazene. To this, 6.16 vol. % of magnesium hydroxide as a flame retardant auxiliary, 8.00 vol. % of 3-aminopropyl ethoxysilane as a cross-linking agent, and 39.38 vol. % of Sendust flaky powder as a flaky metallic soft magnetism powder were mixed, and then the resultant mixture was deposited to form a film with a thickness of 100 µm by using a doctor blade. Two layers of the obtained films were stacked and formed into a sheet with a thickness of 100 µm in a hot press at 150° C. for three minutes. After conducting the test in accordance with the UL94V flame retardancy test with regard to the film and sheet, and both of them burned to reach fire the clamp and both were NG judgment.

For the film, µ' (at 3 MHz)=50.79, density was 1.81 (g/cm$^3$),

For the sheet, µ' (at 3 MHz)=138.37, density was 3.32 (g/cm$^3$).

Reference Example 2

An organic binding material was prepared by mixing 17.6 vol. % of alkyl acrylate copolymer as solid content of alkyl acrylate copolymer dissolved in toluene and 38.92 vol. % of polybisphenoxyphosphazene. To this, 4.41 vol. % of 3-aminopropyl ethoxysilane as a cross-linking agent and 39.07 vol. % of Sendust flaky powder as a flaky metallic soft magnetism powder were mixed, and then the resultant mixture was deposited to form a film with a thickness of 100 µm using a doctor blade. Two layers of the obtained films were stacked and formed into a sheet with a thickness of 100 µm in a hot press at 150° C. for three minutes. After conducting the test in accordance with the UL94V flame retardancy test with regard to the film and sheet, and both of them burned to reach fire to the clamp and both were NG judgment.

For the film, µ' (at 3 MHz)=43.75, density was 2.05 (g/cm$^3$),

For the sheet, µ' (at 3 MHz)=117.68, density was 3.09 (g/cm$^3$).

Reference Example 3

An organic binding material was prepared by mixing 18.41 vol. % of alkyl acrylate copolymer as solid content of alkyl acrylate copolymer dissolved in toluene and 29.94 vol. % of polybisphenoxyphosphazene. To this, 6.16 vol. % of magnesium hydroxide as a flame retardant auxiliary, 4.62 vol. % of 3-aminopropyl ethoxysilane as a cross-linking agent, and 40.87 vol. % of Sendust flaky powder as a flaky metallic soft magnetism powder were mixed, and then and then the resultant mixture was deposited to form a film with a thickness of 100 µm using a doctor blade. Three layers of the obtained films were stacked and formed into a sheet with a thickness of 100 μm in a hot press at 150° C. for three minutes. After conducting the test in accordance with the UL94V flame retardancy test with regard to the film and sheet, and both of them burned to reach fire to the clamp and both were NG judgment.

For the film, $\mu'$ (at 3 MHz)=30.36, density was 1.20 (g/cm$^3$),

For the sheet, $\mu'$ (at 3 MHz)=130.00, density was 3.10 (g/cm$^3$).

Reference Example 4

An organic binding material was prepared by mixing 18.62 vol. % of alkyl acrylate copolymer as solid content of alkyl acrylate copolymer dissolved in toluene and 27.63 vol. % of polybisphenoxyphosphazene. To this, 7.75 vol. % of magnesium hydroxide as a flame retardant auxiliary, 4.67 vol. % of 3-aminopropyl ethoxysilane as a cross-linking agent, and 41.34 vol. % of Sendust flaky powder as a flaky metallic soft magnetism powder were mixed, and then the resultant mixture was deposited to form a film with a thickness of 100 μm using a doctor blade. Three layers of the obtained films were stacked and formed into a sheet with a thickness of 100 μm in a hot press at 150° C. for three minutes. After conducting the test in accordance with the UL94V flame retardancy test with regard to the film and sheet, and both of them burned to reach fire to the clamp and both were NG judgment.

For the film, $\mu'$ (at 3 MHz)=27.68, density was 1.23 (g/cm$^3$),

For the sheet, $\mu'$ (at 3 MHz)=122.30, density was 3.12 (g/cm$^3$).

Reference Example 5

An organic binding material was prepared by mixing 21.63 vol. % of alkyl acrylate copolymer as solid content of alkyl acrylate copolymer dissolved in toluene and 36.90 vol. % of polybisphenoxyphosphazene. To this, 5.37 vol. % of 3-aminopropyl ethoxysilane as a cross-linking agent and 36.10 vol. % of Sendust flaky powder as a flaky metallic soft magnetism powder were mixed, and then the resultant mixture was deposited to form a film with a thickness of 100 μm using a doctor blade. Three layers of the obtained films were stacked and formed into a sheet with a thickness of 100 μm in a hot press at 150° C. for three minutes. After conducting the test in accordance with the UL94V flame retardancy test with regard to the film and sheet, and both of them burned to reach fire to the clamp and both were NG judgment.

For the film, $\mu'$ (at 3 MHz)=27.63, density was 1.18 (g/cm$^3$),

For the sheet, $\mu'$ (at 3 MHz)=121.99, density was 3.01 (g/cm$^3$).

Reference Example 6

An organic binding material was prepared by mixing 17.80 vol. % of alkyl acrylate copolymer as solid content of alkyl acrylate copolymer dissolved in toluene and 28.96 vol. % of polybisphenoxyphosphazene. To this, 9.25 vol. % of melamine cyanurate as a flame retardant auxiliary, 4.46 vol. % of 3-aminopropyl ethoxysilane as a cross-linking agent, and 39.53 vol. % of Sendust flaky powder as a flaky metallic soft magnetism powder were mixed, and then the resultant mixture was deposited to form a film with a thickness of 100 μm using a doctor blade. Three layers of the obtained films were stacked and formed into a sheet with a thickness of 100 μm in a hot press at 150° C. for three minutes. After conducting the test in accordance with the UL94V flame retardancy test with regard to the film and sheet, and both of them burned to reach fire to the clamp and both were NG judgment.

For the film, $\mu'$ (at 3 MHz)=25.39, density was 1.12 (g/cm$^3$),

For the sheet, $\mu'$ (at 3 MHz)=122.39, density was 3.01 (g/cm$^3$).

Reference Example 7

An organic binder was made by mixing 17.85 vol. % of alkyl acrylate copolymer as solid content of alkyl acrylate copolymer dissolved in toluene and 26.50 vol. % of polybisphenoxyphosphazene. To this, 11.54 vol. % of melamine cyanurate as a flame retardant auxiliary, 4.48 vol. % of 3-aminopropyl ethoxysilane as a cross-linking agent, and 39.64 vol. % of Sendust flaky powder as a flaky metallic soft magnetism powder were mixed, and then the resultant mixture was deposited to form a film with a thickness of 100 μm using a doctor blade. Three layers of the obtained films were stacked and formed into a sheet with a thickness of 100 μm in a hot press at 150° C. for three minutes. After conducting the test in accordance with the UL94V flame retardancy test with regard to the film and sheet, and both of them burned to reach fire to the clamp and both were NG judgment.

For the film, $\mu'$ (at 3 MHz)=27.44, density was 1.21 (g/cm$^3$),

For the sheet, $\mu'$ (at 3 MHz)=122.64, density was 3.02 (g/cm$^3$).

Example 1

An organic binding material that forms char during flame contact was prepared with 17.91 vol. % of alkyl acrylate copolymer as solid content of alkyl acrylate copolymer dissolved in toluene and 23.46 vol. % of polybisphenoxyphosphazene as a binder. To this, 14.35 vol. % of melamine cyanurate as a flame retardant auxiliary, 4.49 vol. % of 3-aminopropyl ethoxysilane as a cross-linking agent, and 39.78 vol. % of Sendust flaky powder as a flaky metallic soft magnetism powder were mixed, and then the resultant mixture was deposited to form a film with a thickness of 100 μm using a doctor blade. Three layers of the obtained films were stacked and formed into a sheet with a thickness of 100 μm in a hot press at 150° C. for three minutes. After conducting the test in accordance with the UL94V flame retardancy test with regard to the film and sheet, and the result was V-0 for both.

For the film, $\mu'$ (at 3 MHz)=37.50, density was 1.51 (g/cm$^3$),

For the sheet, $\mu'$ (at 3 MHz)=132.00, density was 3.23 (g/cm$^3$).

Further, films were stacked to form to sheets with thicknesses of 25 μm and 50 μm, respectively. After conducting the test in accordance with the UL94V flame retardancy test with regard to both sheets, and the result was V-0 for both sheets.

Example 2

An organic binding material that forms char during flame contact was prepared with 18.00 vol. % of alkyl acrylate copolymer as solid content of alkyl acrylate copolymer dissolved in toluene and 19.38 vol. % of polybisphenoxyphosphazene as a binder. To this, 18.14 vol. % of melamine cyanurate as a flame retardant auxiliary, 4.51 vol. % of 3-aminopropyl ethoxysilane as a cross-linking agent, and 39.97 vol. % of Sendust flaky powder as a flaky metallic soft magnetism powder were mixed, and then the resultant mixture was deposited to form a film with a thickness of 100 μm using a doctor blade. Three layers of the obtained films were stacked and formed into a sheet with a thickness of 100 μm in a hot press at 150° C. for three minutes. After conducting the test in accordance with the UL94V flame retardancy test with regard to the film and sheet, and the result was V-0 for both.

For the film, μ' (at 3 MHz)=35.45, density was 1.42 (g/cm$^3$),

For the sheet, μ' (at 3 MHz)=123.53, density was 3.09 (g/cm$^3$).

Further, films were stacked to form to sheets with thicknesses of 25 μm and 50 μm, respectively. After conducting the test in accordance with the UL94V flame retardancy test with regard to both sheets, and the result was V-0 for both sheets.

Example 3

An organic binding material that forms char during flame contact was prepared with 19.24 vol. % of alkyl acrylate copolymer as solid content of alkyl acrylate copolymer dissolved in toluene and 20.72 vol. % of polybisphenoxyphosphazene as a binder. To this, 12.49 vol. % of magnesium hydroxide which has endothermy effect, 4.82 vol. % of 3-aminopropyl ethoxysilane as a cross-linking agent, and 42.72 vol. % of Sendust flaky powder as a flaky metallic soft magnetism powder were mixed, and then the resultant mixture was deposited to form a film with a thickness of 100 μm using a doctor blade. Three layers of the obtained films were stacked and formed into a sheet with a thickness of 100 μm in a hot press. After conducting the test in accordance with the UL94V flame retardancy test with regard to the film and sheet, and the result was V-0 for both.

For the film, μ' (at 3 MHz)=50.00, density was 1.81 (g/cm$^3$),

For the sheet, μ' (at 3 MHz)=142.43, density was 3.40 (g/cm$^3$).

Further, films were stacked to form to sheets with thicknesses of 25 μm and 50 μm, respectively. After conducting the test in accordance with the UL94V flame retardancy test with regard to both sheets, and the result was V-0 for both sheets.

Comparative Example 1

To 33.20 vol. % of alkyl acrylate copolymer as a binder, 3.19 vol. % of red phosphorous whose surface was coated with 4.05 vol. % of aluminum hydroxide which used as a flame retardant auxiliary, 11.21 vol. % of melamine cyanurate as a flame retardant auxiliary, 8.17 vol. % of 3-aminopropyl ethoxysilane as a cross-linking agent, and 40.19 vol. % of Sendust flaky powder as a flaky metallic soft magnetism powder were mixed and formed to a film. Films were then stacked and formed into sheets using a hot press. After conducting the test in accordance with the UL94V flame retardancy test with regard to the film and sheet, and the result was V-0 for both.

For the film, μ' (at 3 MHz)=25.00, density was 1.10 (g/cm$^3$),

For the sheet, μ' (at 3 MHz)=88.00, density was 2.70 (g/cm$^3$).

The a, b and c in FIG. 1 each show the cross-section of the sheets obtained from Comparative Example 1, Example 2, and Example 3, respectively, observed under a scanning electron microscope (SEM). In FIG. 1, numerous 1 represents Sendust flaky powder, numerous 2 represents red phosphorous coated with Al(OH)$_3$, and numerous 3, 4, and 5 each represent organic binding materials containing the flame retardant auxiliary of each sheet. As shown in FIG. 1, in Comparative Example 1, magnetic permeability is low, and filling and orientation of Sendust flaky powder 1 are interrupted due to red phosphorous 2 which has large particle size. The sheets from Examples 2 and 3 have Sendust flaky powder 1 oriented to the plane of the sheets, and voids are reduced as well.

Further, FIG. 2 shows the particle size distribution of each flame-retardant ingredient (granular material). Each D90 is about 17 times in red phosphorous coated with aluminum hydroxide which labels 6, about nine times in red phosphorous coated with aluminum hydroxide which labels 7, about five times in melamine cyanurate which labels 8, and about twice in magnesium hydroxide which labels 9, compared to the thickness (about 1 μm) of flaky magnetic powder (Sendust). Also, melamine cyanurate is an organic substance, so it deforms due to high pressure molding and is difficult to be a cause of filling or orientation interruption.

In FIG. 1 and FIG. 2, for the granular material of such flame-retardant ingredients, particle size distribution $D_{90}$ is preferably five times or less, and more preferably twice or less of the thickness of the flaky metallic soft magnetism powder.

Further, the results of Reference Examples 1 to 7 are shown in Table 1, and the results of Examples 1 to 3 are shown in Table 2. The conversion from the volume content (vol. %) to mass content (wt. %) were calculated from the specific gravity of each material. The percentage of phosphorous content was calculated with the content of phosphorous compound in the phosphazene compound at 13%.

TABLE 1

| | | | Ref Ex1 | | Ref Ex2 | | Ref Ex3 | | Ref Ex4 | | Ref Ex5 | | Ref Ex6 | | Ref Ex7 | |
|---|---|---|---|---|---|---|---|---|---|---|---|---|---|---|---|---|
| | Name | Specific gravity | Vol % | wt % | Vol % | wt % | Vol % | wt % | Vol % | wt % | Vol % | wt % | Vol % | wt % | Vol % | wt % |
| Organic binding material | AACP | 1.1 | 32.52 | 10.27 | 17.6 | 5.60 | 18.41 | 5.60 | 18.62 | 5.60 | 21.63 | 7.26 | 17.8 | 5.60 | 17.85 | 5.60 |
| | PBPN | 1.35 | 13.93 | 5.40 | 38.92 | 15.20 | 29.94 | 11.18 | 27.63 | 10.20 | 36.9 | 15.20 | 28.96 | 11.18 | 26.5 | 10.20 |
| Flame retardant auxiliary | MO | 2.36 | 6.16 | 4.17 | | | 6.16 | 4.02 | 7.75 | 5.00 | | | | | | |
| | MC | 1.52 | | | | | | | | | | | 9.25 | 4.02 | 11.54 | 5.00 |

TABLE 1-continued

|  | Name | Specific gravity | Ref Ex1 Vol % | Ref Ex1 wt % | Ref Ex2 Vol % | Ref Ex2 wt % | Ref Ex3 Vol % | Ref Ex3 wt % | Ref Ex4 Vol % | Ref Ex4 wt % | Ref Ex5 Vol % | Ref Ex5 wt % | Ref Ex6 Vol % | Ref Ex6 wt % | Ref Ex7 Vol % | Ref Ex7 wt % |
|---|---|---|---|---|---|---|---|---|---|---|---|---|---|---|---|---|
| Cross-linking agent | APES | 0.94 | 8.01 | 2.16 | 4.41 | 1.20 | 4.62 | 1.20 | 4.66 | 1.20 | 5.37 | 1.54 | 4.46 | 1.20 | 4.47 | 1.20 |
| Flaky powder | SEN | 6.9 | 39.38 | 78.00 | 39.07 | 78.00 | 40.87 | 78.00 | 41.34 | 78.00 | 36.1 | 76.00 | 39.53 | 78.00 | 39.64 | 78.00 |
| Total | | | 100 | | 100 | | 100 | | 100 | | 100 | | 100 | | 100 | |
| Weight ratio | Equation (1) | | 0.07 | | 0.35 | | 0.26 | | 0.24 | | 0.27 | | 0.26 | | 0.24 | |
|  | Equation (2) | | 0.93 | | 2.71 | | 2.71 | | 2.71 | | 2.09 | | 2.71 | | 2.72 | |
| UL94V | Film | | NG | | NG | | NG | | NG | | NG | | NG | | NG | |
|  | Sheet | | NG | | NG | | NG | | NG | | NG | | NG | | NG | |
| Magnetic permeability μ' | Film | | 50.79 | | 43.75 | | 30.36 | | 27.68 | | 27.63 | | 25.39 | | 27.44 | |
|  | Sheet | | 138.37 | | 117.68 | | 130.00 | | 122.30 | | 121.99 | | 122.39 | | 122.64 | |

TABLE 2

|  | Name | Specific gravity | Example 1 Vol % | Example 1 wt % | Example 2 Vol % | Example 2 wt % | Example 3 Vol % | Example 3 wt % |
|---|---|---|---|---|---|---|---|---|
| Organic binding material | AACP | 1.1 | 17.91 | 5.60 | 18 | 5.60 | 19.24 | 5.60 |
|  | PBPN | 1.35 | 23.46 | 9.00 | 19.38 | 7.40 | 20.72 | 7.40 |
| Flame retardant auxiliary | MO | 2.36 |  |  |  |  | 12.49 | 7.80 |
|  | MC | 1.52 | 14.35 | 6.20 | 18.14 | 7.80 |  |  |
| Cross-linking agent | APES | 0.94 | 4.5 | 1.20 | 4.51 | 1.20 | 4.83 | 1.20 |
| Flaky powder | SEN | 6.9 | 39.78 | 78.00 | 39.97 | 78.00 | 42.72 | 78.00 |
| Total |  |  | 100 |  | 100 |  | 100 |  |
| Weight ratio | Equation (1) |  | 0.21 |  | 0.17 |  | 0.17 |  |
|  | Equation (2) |  | 2.71 |  | 2.71 |  | 2.71 |  |
| UL94V | Film |  | V-0 |  | V-0 |  | V-0 |  |
|  | Sheet |  | V-0 |  | V-0 |  | V-0 |  |
| Magnetic permeability μ' | Film |  | 37.50 |  | 35.45 |  | 50.00 |  |
|  | Sheet |  | 132.00 |  | 123.53 |  | 142.43 |  |

The abbreviations for Tables 1 and 2 are as follows.
AACP: Alkyl acrylate copolymer
PBPN: Polybisphenoxyphosphazene
MO: Magnesium hydroxide
MC: Melamine cyanurate
APES: 3-Aminopropylethoxysilane
SEN: Sendust Flaky Powder

REFERENCE SIGNS LIST

1. Flaky metallic soft magnetism powder (Sendust Flaky Powder)
2. Red phosphorus
3-5. Organic binding material

The invention claimed is:

1. A composite magnetic body comprising a flaky metallic soft magnetism powder with a volume content of 35% or more and 55% or less, wherein the composite magnetic body further comprises a phosphazene compound, a binder resin, and a phosphorus-free flame retardant auxiliary so that equations (1) and (2) are satisfied:

$$0.17 \leq P/B \leq 0.21 \quad (1)$$

$$0.89 \leq (PN+RA)/B \leq 2.71 \quad (2)$$

(In the equations, PN denotes the mass % of the phosphazene compound in the composite magnetic body, RA denotes the mass % of the flame retardant auxiliary in the composite magnetic body, B denotes the mass % of the binder resin in the composite magnetic body, and P denotes the mass % of phosphorus in the composite magnetic body).

2. The composite magnetic body according to claim 1, wherein the phosphazene compound is polybisphenoxyphosphazene.

3. The composite magnetic body according to claim 1, wherein the phosphazene compound is admixed to the composite magnetic body as an organic binding material by dissolving in a solvent along with the binder resin.

4. The composite magnetic body according to claim 1, wherein the binder resin is alkyl acrylate copolymer.

5. The composite magnetic body according to claim 1, wherein the phosphorus-free flame retardant auxiliary is selected from metal hydroxides and nitrogenous cyclic compounds.

6. The composite magnetic body according to claim 1, wherein the composite magnetic body further comprises a silane compound.

7. A magnetic sheet molded into a sheet from the composite magnetic body according to claim 1.

8. A production method of a magnetic sheet comprising molding into a sheet using a hot press from the composite magnetic body according to claim 1.

9. A magnetic sheet molded into a sheet from the composite magnetic body according to claim 2.

10. A magnetic sheet molded into a sheet from the composite magnetic body according to claim 3.

11. A magnetic sheet molded into a sheet from the composite magnetic body according to claim 4.

12. A magnetic sheet molded into a sheet from the composite magnetic body according to claim 5.

13. A magnetic sheet molded into a sheet from the composite magnetic body according to claim 6.

14. A production method of a magnetic sheet comprising molding into a sheet using a hot press from the composite magnetic body according to claim 2.

15. A production method of a magnetic sheet comprising molding into a sheet using a hot press from the composite magnetic body according to claim 3.

16. A production method of a magnetic sheet comprising molding into a sheet using a hot press from the composite magnetic body according to claim 4.

17. A production method of a magnetic sheet comprising molding into a sheet using a hot press from the composite magnetic body according to claim 5.

* * * * *